Patented Jan. 22, 1946

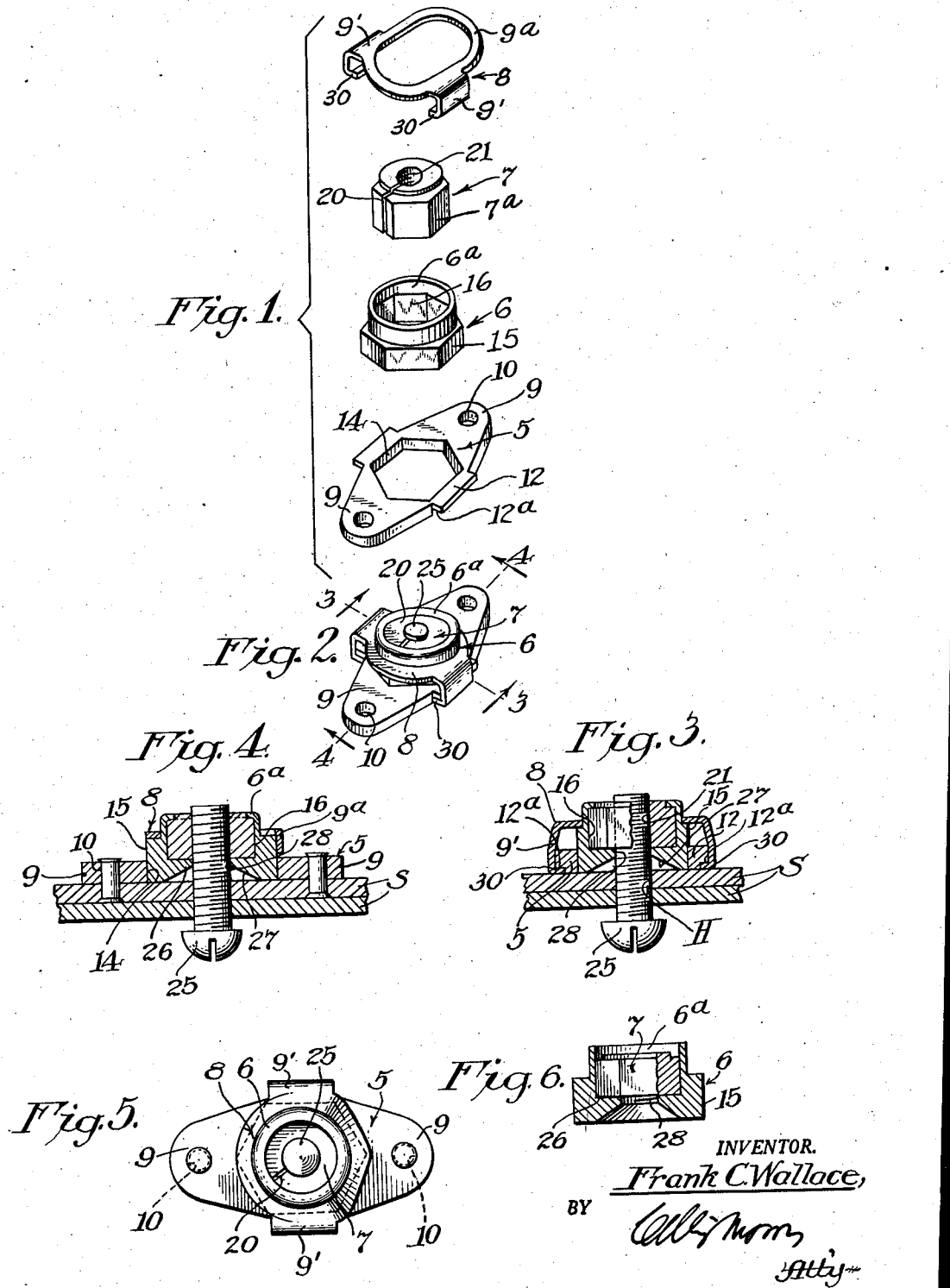

2,393,436

UNITED STATES PATENT OFFICE 2,393,436

LOCK NUT

Frank C. Wallace, Los Angeles, Calif., assignor to Herman H. Helbush, Los Angeles, Calif.

Application July 31, 1943, Serial No. 496,864

3 Claims. (Cl. 151—21)

This invention relates to improvements in lock nuts, having as one of its primary objects the provision of a lock nut capable of resiliently gripping a screw or bolt in a manner to lock the nut against becoming loosened by vibration or other accidental means.

My invention also has as an object the provision of a nut peculiarly adaptable for use in conjunction with an anchor plate to hold the nut in position to be engaged by a screw or bolt at the blind or inaccessible end of a screw-passing hole.

Another object of the invention is to provide a novel nut and anchor assembly wherein the nut may be detachably mounted in the anchor so as to be replaceable if desired.

My invention has still further advantages and how those as well as the above-enumerated objects are achieved will be best understood from the following detailed explanation of a presently preferred adaptation wherein reference will be made to the accompanying drawing, in which:

Fig. 1 is a perspective of the various component parts disassembled;

Fig. 2 is a perspective of the parts assembled;

Fig. 3 is a section on line 3—3 of Fig. 2;

Fig. 4 is a section on line 4—4 of Fig. 2;

Fig. 5 is a top plan view of the nut seen in Fig. 4; and

Fig. 6 is a vertical medial section of the shell and its carried nut before the nut is permanently secured in position in the shell.

Referring now to the drawing, I show an anchor plate 5, a shell 6, a nut 7, and a shell-retaining yoke 8.

Plate 5 has end flanges 9 through which rivet holes 10 are provided for the purpose of securing the plate to a perforated sheet S. Usually the plate is secured over the blind or inaccessible end of a perforation in the sheet and usually the device is utilized to hold in superposed relation a plurality of sheets S. The plate has oppositely disposed side flanges 12 whose under surfaces are stepped at 12a for the purpose to be described, and has an hexagonal central opening 14. In practice the plate is so disposed with relation to the sheet upon which it is mounted that the opening 14 is concentric with the screw-passing hole H in the sheet or sheets.

The shell 6 has an hexagonal flange 15 which fits into the opening 14, the side walls of the opening holding the shell against relative rotation, and the inner surface of the shell is likewise hexagonal adjacent its bottom as shown at 16 to receive and hold against rotation the hexagonal portion 7a of nut 7.

The nut 7 has a radial slot or split 20 extending outwardly from its threaded bore 21 and opening through the side wall, and the threaded bore 21 is of a diameter slightly less than the outside diameter of the screw 25 which it receives, so that as the screw is threaded into the bore, the nut is laterally expanded within the shell. Thus the nut is caused to resiliently grip the screw, being made of a material having the desired resiliency.

The shell 6 is initially made with its top edge straight, as shown in Figs. 1 and 6, and after the nut 7 is placed therein the edge portion 6a of the shell is peened over to retain the nut permanently in the shell, the bottom end of the nut resting against the bottom wall 26 of the shell. The under surface of the end wall 26 of the shell is concaved as shown at 27 and the end wall of the shell has an opening 28 coaxial with the opening H in the sheets as well as coaxial with the bore in the nut, so that when the device is secured in position on the sheet, as shown in Figs. 3 and 4, the nut is held in position to receive the screw 25.

For the purpose of retaining the shell and its carried nut in position in the anchor plate opening 14 prior to the insertion of the screw, I provide a yoke 8 which engages over the flanged portion of the shell and has fingers 9' converging inwardly as at 30 at their lower ends to engage under the step 12a of the flanges 12. The yoke has a curved front extension 9a which is sufficiently pliable to be bent downwardly about the side of the shell after being applied whereby to prevent the yoke from sliding out of its shell-retaining position.

In operation, as the screw 25 is threaded into the relatively smaller bore of the nut it expands the nut causing it to resiliently grip the screw. The nut should fit in the shell with sufficient tolerance to permit the desired lateral expansion of the nut so that constriction of the nut about the screw is substantial. I find that my lock nut will not work loose under vibration and, in fact, it requires substantial rotative pressure on the screw to remove it from the nut.

While I have described my lock nut in conjunction with an anchor member, it will be understood, of course, that the shell and nut assembly may be employed apart from the plate 5 and yoke 8, in which event the nut would be applied to the screw in the usual manner of applying nuts, as by a wrench. In some uses the shell may even be dispensed with, since its main function is to house the split nut.

It frequently happens that it becomes necessary to replace a nut in such an anchor and it will be observed that the shell with carried nut may be readily removed after the screw is withdrawn, by lifting the yoke extension 9a and sliding the yoke off the anchor plate.

While, in the foregoing, I have resorted to considerable detail of structure and association of parts in describing a particular example of my invention, I wish it to be understood that I have done so merely to make my invention understood and that I do not limit my invention to such details. On the contrary, my invention is only to be limited as appears in the appended claims.

I claim:

1. A device of the class described comprising, in combination, an anchor plate adapted to be secured to a perforated sheet, an opening in the plate to align with the perforation in the sheet, a cylindric shell having a base flange portion fitting into the opening and a radially split nut fitting into the shell, said nut presenting a longitudinal threaded screw-receiving bore of a diameter less than the diameter of the screw whereby the nut is laterally expansible by virtue of entering the screw in the bore, and means detachably mounted on the anchor plate and engaging the shell in a manner to releasably lock the shell in the opening in the plate, said last-named means comprising a yoke having fingers engageable under the plate, a portion engageable against the base flange of the shell and a pliable extension engageable against the side of the shell.

2. An anchor for holding a nut having a flat sided body and an axial threaded bore, comprising a plate, flange means on the plate for directly securing it to a perforated work sheet, said plate having an angular opening therethrough adapted to register with the perforation in the work sheet, a nut-retaining shell having an angular side surface fitting at its bottom portion in said opening and a screw-passing hole in its bottom in register with said bore, said shell having a reduced diameter annular peripheral portion adjacent its top end, and means for detachably securing the shell in said opening comprising a yoke member having slidable locking engagement with the plate and said annular peripheral portion of the shell.

3. An anchor for holding a nut having a flat sided body and an axial threaded bore, comprising a plate adapted to be secured to a perforated work sheet, said plate having an angular opening therethrough adapted to register with the perforation in the work sheet and having a pair of oppositely disposed, outwardly projecting side flanges, a nut-retaining shell having an angular side surface fitting at its bottom portion in said opening and a screw-passing hole in its bottom in register with said bore, said shell having a reduced diameter annular peripheral portion adjacent its top end, and means for detachably securing the shell in said opening comprising a yoke member having slidable locking engagement with said flanges and said annular peripheral portion of the shell.

FRANK C. WALLACE.